Feb. 17, 1970  E. G. WILLETTE  3,495,680
EXHAUST SILENCING SYSTEM
Filed March 13, 1969
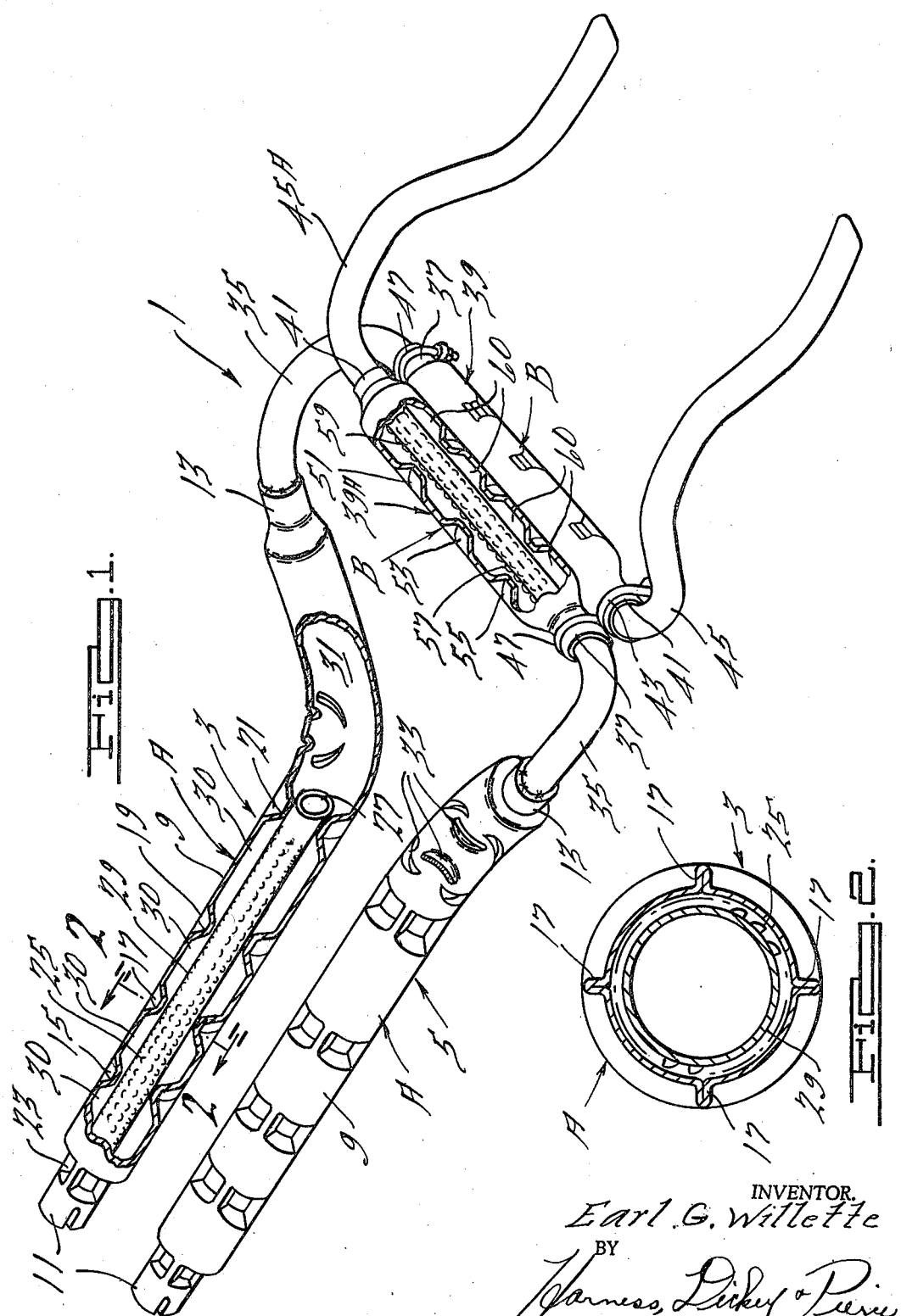
INVENTOR.
Earl G. Willette
BY
Harness, Dickey & Pierce
ATTORNEYS.

United States Patent Office 3,495,680
Patented Feb. 17, 1970

3,495,680
EXHAUST SILENCING SYSTEM
Earl G. Willette, Racine, Wis., assignor to Walker Manufacturing Company, Racine, Wis., a corporation of Delaware
Filed Mar. 13, 1969, Ser. No. 806,963
Int. Cl. F01n *1/00, 5/00;* F02m *35/00*
U.S. Cl. 181—35   4 Claims

ABSTRACT OF THE DISCLOSURE

A dual exhaust system has left hand and right hand sides which each include a front longitudinally extending muffler section and a rear transverse muffler section, each section attenuating selected modes of vibration as well as high frequency ranges for roughness control. A portion of the front section and a connecting pipe between sections are bent to provide a rear axle kick-up.

Brief summary of the invention

It is the purpose of this invention to provide compact, small diameter exhaust system that is acoustically effective and capable of fitting in a restricted space beneath a current passenger automobile.

In preferred form the invention accomplishes this by means of front and rear muffler sections formed by small diameter outer pipes which are reduced in diameter at axially selected points to support perforated inner gas flow tubes and form sound attenuating chambers with them. The first section and a connecting pipe are bent to form a rear axle kick-up and the rear sections are transverse to the length of the vehicle so that a relatively short length, small diameter system is provided.

Description of the drawings

FIGURE 1 is a perspective view, partly broken away, of a dual exhaust embodying the invention; and FIGURE 2 is a cross section along the line 2—2 of FIGURE 1.

Detailed description of the invention

The dual exhaust system 1 is designed for use on a specific 1969 model automobile of U.S. manufacture. It has a lefthand side 3 and a righthand side 5 which are substantially identical in physical construction and acoustical function, each of which has front and rear silencing units or mufflers A and B. Each system includes a first outer pipe 9 which is reduced in diameter at its inlet end to form an inlet bushing 11 and reduced in diameter at its outlet end to form an outlet bushing 13. The outer pipe 9 has additional non-equally spaced pinched sections which reduce it in diameter as seen at 15, 17, 19, and 21. Supported in pinched down reduced section 23 as a part of the inlet bushing 11 is the inlet end of a gas flow pipe 25 which has an outlet end 27 that is slidably supported in the pinched down section 21. The pinched down sections 15, 17, and 19 are on a preferably slightly larger diameter than the diameter of louvers 29 which extend around the circumference of and along the entire length of the pipe 25 so that they do not contact the pipe and thereby prevent cracking noises due to relative expansion and contraction. The chambers 30 formed by the pinch down sections and pipe 25 are of differing lengths and volumes and act with the louvers as high frequency tuning chambers to tune different frequency ranges for roughness control. The chambers 30 are also located and sized to attenuate the fifth mode of vibration for the exhaust system length and engine.

A substantial empty space remains within the pipe 9 between the outlet end 27 of flow tube 25 and the outlet bushing 23. This forms an expansion chamber or volume 31 to lower the overall sound level. Additional energy removal may be obtained in the chamber 31 by providing it with triad indentations 33 as described in Patent 3,259,-206, it being noted that the section of the pipe containing the chamber 31 and including the triad sections 33 forms the elbow of a bend.

Secured in the outlet bushing 13, preferably by welding, is a connecting pipe 35 that is preferably of the same diameter as the gas flow pipe 25. Its outlet is received in the inlet bushing 37 formed by a reduced diameter portion of a second outer pipe 39, the second outer pipe for the system 5 being identified as 39a. The outer pipe 39 is reduced at its other end to form an outlet bushing 41 which in the case of the outer pipe 39 is preferably secured by a clamp 43 to the inlet end of a tailpipe 45 whereas in the case of the outer pipe 39a the tailpipe 45a is preferably secured by welding to the outlet bushing 41.

The connecting pipes 35 for the left and righthand sides 3 and 5 are preferably bent through an angle so that the outlet ends which are secured by clamps 47 to the inlet bushings 37 of the respective outer pipes 39 and 39a extend substantially at right angles to the length of the outer pipes 9 thereby disposing the second outer pipes 39 and 39a at substantially right angles or transverse to the length of an automobile on which the system is mounted. The two outer tubes 39 and 39a are preferably placed side by side as seen in FIGURE 1. The tailpipes 35 and 45a include right angle bends so that they extend substantially parallel to each other and to the length of the outer pipes 9.

The outer pipes 39 and 39a include reduced diameter sections 51, 53, and 55 which extend inwardly to be located adjacent to but out of contact with the louvers 57 that extend around the circumference of and along length of a second gas flow pipe 59 that has its inlet end supported in bushing 37 and its outlet end supported in bushing 41 of the outer pipe 39 or 39a, the pipe 59 preferably being the same diameter as pipes 25 and 35. A series of chambers 60 are formed by the outer pipe 39 (or 39a) with the inner gas flow tube 59 which act as high frequency chambers and which are also located and sized to attenuate the third mode of vibration (about 70 c.p.s.) for the exhaust system.

In operation, exhaust pipes (not shown) connect the inlet bushing 11 of each of the sections 3 and 5 with the exhaust manifolds of an internal combustion engine (not shown) and as the gases enter the outer pipe or housing 9 they are acoustically connected through the louvers 29 in pipe 25 with a series of varying volume high frequency tuning chambers 30 until they leave the end 27 to enter the expansion chamber 21. Within this chamber the baffle effect and turbulence effect of indentations 33 along with the sharp reduction in velocity due to the enlarged diameter of the chamber 31 act to reduce the sound level. The front chambers 30 along the length of the pipe 25 are located adjacent its anti-node and are effective to attenuate the fifth mode of vibration (about 114 c.p.s.) for the exhaust system as the gas passes through the pipe 25.

Gas from the outer pipe 9 on each side enters the connecting pipe 35 to reach outer pipe 39 (or 39a) where it is subjected to the high frequency tuning action of the small chambers 60 and also to attenuation of the third mode of vibration for the exhaust system.

It will be noted that the exhaust system 1 is small in size and includes a bend in pipes 9 and 35 which enable it to arch over the rear axle assembly of the vehicle. The transverse arrangement of pipes 39 and 39a occupy very little longitudinal space and with the bend in pipe 9 provide for an effective but short length system.

I claim:
1. An exhaust system for an internal combustion engine comprising an outer pipe of substantially uniform diameter having a reduced diameter portion at one end providing an inlet bushing and a reduced diameter portion at the other end providing an outlet bushing, a perforated gas flow pipe having an inlet end supported by said inlet bushing and extending axially within the outer pipe, said outer pipe having reduced diameter portions extending radially inwardly toward the gas flow pipe and acting with the pipe to define a series of axially adjacent spit chambers, one of said reduced diameter portions engaging the gas pipe to act with the inlet bushing to support said pipe, said chambers being of different lengths to provide for tuning of different frequencies, said outer pipe having an empty expansion chamber and said gas flow pipe having an outlet end opening into the inlet end of the expansion chamber, a connecting conduit of substantially the same diameter as the gas flow pipe secured to the outlet bushing of the outer pipe, a second outer pipe having a reduced diameter inlet bushing secured to the outlet end of said connecting pipe, said connecting pipe being bent so that said second outer pipe extends substantially at right angles to the length of the first outer pipe, said second outer pipe having a reduced end forming an outlet bushing, a second perforated gas flow pipe of substantially the same diameter as the first gas flow pipe having an inlet end supported in the inlet end of said second outer pipe and an outlet end supported in the outlet bushing of the second outer pipe, said outer pipe having reduced diameter portions extending toward the gas flow pipe and acting with it to define a series of axially adjacent spit chambers, a tailpipe secured in the outlet bushing of the second outer pipe and of substantially the same diameter as the connecting pipe, said first spit chamber in the first outer pipe being located to attenuate the fifth mode of vibration for the exhaust system, said second outer pipe spit chambers being located to attenuate the third mode of vibration for the exhaust system.

2. A dual exhaust system for an internal combustion engine comprising left and righthand sides each comprising an outer pipe of substantially uniform diameter having a reduced diameter portion at one end providing an inlet bushing and a reduced diameter portion at the other end providing an outlet bushing, a perforated gas flow pipe having an inlet end supported by said inlet bushing and extending axially within the outer pipe, said outer pipe having reduced diameter portions extending radially inwardly toward the gas flow pipe and acting with the pipe to define a series of axially adjacent spit chambers, one of said reduced diameter portions engaging the gas pipe to act with the inlet bushing to support said pipe, said chambers being of different lengths to provide for tuning of different frequencies, said outer pipe having an empty expansion chamber and said gas flow pipe having an outlet end opening into the inlet end of the expansion chamber, a connecting conduit of substantially the same diameter as the gas flow pipe secured to the outlet bushing of the outer pipe, a second outer pipe having a reduced diameter inlet bushing secured to the outlet end of said connecting pipe, said second outer pipe having a reduced end forming an outlet bushing, a second perforated gas flow pipe of substantially the same diameter as the first gas flow pipe having an inlet end supported in the inlet end of said second outer pipe and an outlet end supported in the outlet bushing of the second outer pipe, said outer pipe having reduced diameter portions extending toward the gas flow pipe and acting with it to define a series of axially adjacent spit chambers, a tailpipe secured in the outlet bushing of the second outer pipe and of substantially the same diameter as the connecting pipe, and bent to extend substantially parallel to the first outer pipe, said first spit chambers in the first outer pipe being located to attenuate the fifth mode of vibration for the exhaust system, said second outer pipe spit chambers being located to attenuate the third mode of vibration for the exhaust system, the connecting pipes on each of the left and righthand sides being bent to extend toward each other and thereby dispose said second outer pipes transversely to the length of the first outer pipes and in side by side relationship.

3. An exhaust system for an internal combustion engine comprising an outer pipe of substantially uniform diameter having a reduced diameter portion at one end providing an inlet bushing and a reduced diameter portion at the other end providing an outlet bushing, a perforated gas flow pipe having an inlet end supported by said inlet bushing and extending axially within the outer pipe, said outer pipe having reduced diameter portions extending radially inwardly toward the gas flow pipe and acting with the pipe to define a series of axially adjacent spit chambers, one of said reduced diameter portions engaging the gas pipe to act with the inlet bushing to support said pipe, said chambers being of different lengths to provide for tuning of different frequencies, said outer pipe having an empty expansion chamber and said gas flow pipe having an outlet end opening into the inlet of the expansion chamber, a connecting conduit secured to the outlet bushing of the outer pipe, a second outer pipe having a reduced diameter inlet bushing secured to the outlet end of said connecting pipe, said connecting pipe being bent so that said second outer pipe extends substantially at right angles to the length of the first outer pipe, said second outer pipe having a reduced end forming an outlet bushing, a second perforated gas flow pipe having an inlet end supported in the inlet end of said second outer pipe and an outlet end supported in the outlet bushing of the second outer pipe, said outer pipe having reduced diameter portions extending toward the gas flow pipe and acting with it to define a series of axially adjacent spit chambers, and a tailpipe secured in the outlet bushing of the second outer pipe.

4. An exhaust system as set forth in claim 3 wherein the spit chambers in the first outer pipe are located adjacent the anti-node of the fifth mode of vibration for the exhaust system and are effective to attenuate such vibrations and the spit chambers in the second outer pipe are located adjacent the anti-node of the third mode of vibration for the exhaust system and are effective to attenuate such vibrations.

References Cited

UNITED STATES PATENTS

| | | | |
|---|---|---|---|
| 3,036,654 | 5/1962 | Powers | 181—54 |
| 3,219,142 | 11/1965 | Deremer | 181—48 |
| 3,259,206 | 7/1966 | Straw | 181—59 |
| 3,338,331 | 8/1967 | Jettinghoff | 181—48 XR |

FOREIGN PATENTS

| | | |
|---|---|---|
| 506,100 | 10/1951 | Belgium. |
| 751,881 | 7/1956 | Great Britain. |

ROBERT S. WARD, Jr., Primary Examiner

U.S. Cl. X.R.

181—47, 48, 60, 61